United States Patent [19]
Sobajima et al.

[11] Patent Number: 6,040,374
[45] Date of Patent: Mar. 21, 2000

[54] PROPYLENE RESIN COMPOSITION AND METHOD FOR EVALUATING THE SAME

[75] Inventors: Yoshihiro Sobajima; Etsushi Akashige; Hironari Fujii; Akira Amano, all of Yokkaichi, Japan

[73] Assignee: Japan Polychem Corporation, Tokyo-To, Japan

[21] Appl. No.: 09/129,700

[22] Filed: Aug. 5, 1998

[30] Foreign Application Priority Data

Aug. 7, 1997 [JP] Japan .................................. 9-213682
Aug. 18, 1997 [JP] Japan .................................. 9-221757

[51] Int. Cl.$^7$ .......................... C08K 3/34; C08F 110/06; C08F 210/06; C08L 23/12
[52] U.S. Cl. .......................... 524/451; 525/323; 526/348; 526/351
[58] Field of Search .............................. 524/451; 525/88, 525/323; 526/348, 351

[56] References Cited

U.S. PATENT DOCUMENTS

| | | | |
|---|---|---|---|
| 5,374,677 | 12/1994 | Nishio et al. | 524/451 |
| 5,451,642 | 9/1995 | Abe et al. | 525/179 |
| 5,563,194 | 10/1996 | Watanabe et al. | 524/451 |
| 5,708,083 | 1/1998 | Kawamura et al. | 524/451 |
| 5,744,535 | 4/1998 | Akagawa et al. | 524/451 |

*Primary Examiner*—Peter A. Szekely
*Attorney, Agent, or Firm*—Oblon, Spivak, McClelland, Maier & Neustadt, P.C.

[57] ABSTRACT

There is provided a propylene resin composition having an Izod impact strength (23° C., notched) of not less than 5 kJ/m$^2$ and a flexural modulus of not less than 500 MPa, wherein as measured by electron spectroscopy for chemical analysis, the ratio of the valence electron spectral intensity at a bond energy of 16.5 eV to the valence electron spectral intensity at a bond energy of 13.5 eV, I 16.5/I 13.5, is in the range of 1.6 to 2.0.

There is also provided a method for evaluating a propylene resin composition, which comprises subjecting a propylene resin composition to electron spectroscopy for chemical analysis to measure the ratio of the valence electron spectral intensity at a bond energy of 16.5 eV to the valence electron spectral intensity at a bond energy of 13.5 eV, I 16.5/I 13.5; and evaluating, based on the ratio, the amount of a rubber component present on the surface of the composition.

7 Claims, No Drawings

PROPYLENE RESIN COMPOSITION AND METHOD FOR EVALUATING THE SAME

BACKGROUND OF THE INVENTION

1. Field of the Invention

The present invention relates to a propylene resin composition which has a good balance between impact resistance, and rigidity and surface hardness. The present invention also relates to a novel method for evaluating a propylene resin composition, which can be effectively used for providing a propylene resin composition having a good balance of the above properties.

2. Background Art

Propylene resins possess excellent moldability, paintability and mechanical strength and, by virtue of these features, have hitherto been mass-produced for use as materials for various molded products in the filed of industrial parts, for example, automobile parts, such as bumpers, instrument panels, trims, center pillars, door trims, fan shrouds, and glove boxes, and parts for domestic electric appliances, such as televisions, VCRs, and washing machines.

The recent trend in the above application fields towards highly functional, large-sized articles often requires the parts of such articles to be thinner and to have complicated shapes. Such parts should desirably possess well-balanced rigidity and impact resistance.

In order to improve the impact resistance of propylene resins, addition or copolymerization of various rubber components has generally been carried out. In this case, however, the rubber component is generally so soft that the resultant composition is likely to become excessively soft. Molded products of such compositions have a low surface hardness and therefore are easy to be marred. Thus, the conventional propylene resin compositions can hardly satisfy both the impact resistance and surface hardness requirements.

A propylene resin composition has thus been desired which has high impact strength without suffering from the excessive lowering in rigidity and surface hardness.

It is therefore an object of the present invention to provide a propylene resin composition that has a good balance between rigidity and surface hardness, and impact strength.

SUMMARY OF THE INVENTION

It has now been found by the present inventors that regulation of the intensity ratio between certain two valence electron spectral peaks, as measured by electron spectroscopy for chemical analysis of a propylene resin composition, in a specific range enables the amount of a rubber component present on the surface of the composition to be regulated on a suitable level, which ensures excellent impact strength and suitable rigidity and surface hardness of the composition.

Thus, the present invention provides a propylene resin composition having an Izod impact strength (23° C., notched) of not less than 5 kJ/m$^2$ and a flexural modulus of not less than 500 MPa, wherein as measured by electron spectroscopy for chemical analysis, the ratio of the valence electron spectral intensity at a bond energy of 16.5 eV to the valence electron spectral intensity at a bond energy of 13.5 eV, I 16.5/I 13.5, is in the range of 1.6 to 2.0.

According to one preferred embodiment of the present invention, the propylene resin composition has a ratio I 16.5/I 13.5 of 1.8 to 2.0 and a Rockwell hardness of not less than 60.

The present invention further provides a method for evaluating a propylene resin composition, which comprises subjecting a propylene resin composition to electron spectroscopy for chemical analysis to measure the ratio of the valence electron spectral intensity at a bond energy of 16.5 eV to the valence electron spectral intensity at a bond energy of 13.5 eV, I 16.5/I 13.5; and evaluating, based on the ratio, the amount of a rubber component exposed on the surface of the composition.

The propylene resin composition of the present invention has a good balance between impact strength, and rigidity and surface hardness and hence can be advantageously used as a molding material for various articles for daily use and various industrial parts, such as automobile parts and parts for domestic electric appliances, especially automotive trims such as instrument panels, center pillars, and door trims.

DETAILED DESCRIPTION OF THE INVENTION

[I] Propylene resin composition (1) Components

The propylene resin composition of the present invention may comprise the following component (A) alone, or alternatively comprise the component (A), the following component (B) and/or the following component (C) and optionally the following component (D).

(i) Crystalline propylene polymer [component (A)]

Crystalline propylene polymers usable as the component (A) in the propylene resin composition of the present invention include a homopolymer of propylene (polypropylene) and binary or higher block, random, and graft copolymers (or mixtures of these copolymers) of propylene in a predominant amount with other α-olefin (for example, ethylene, 1-butene, 1-pentene, 1-hexene, 4-methyl-1-pentene, or 1-octene), vinyl ester (for example, vinyl acetate), aromatic vinyl monomer (for example, styrene), or vinylsilane (for example, vinyltrimethoxysilane or vinyltrimethylsilane).

Among them, a propylene-ethylene block copolymer comprising a crystalline polypropylene moiety (unit moiety a) and an ethylene-propylene random copolymer moiety (unit moiety b) is preferred. The unit moiety a is prepared by homopolymerization of propylene, while the unit moiety b is prepared by random copolymerization of propylene with ethylene.

In this case, preferably 60 to 95% by weight, particularly preferably 62 to 85% by weight, of the propylene-ethylene block copolymer is accounted for by the unit moiety a from the viewpoint of hardness, heat resistance, and rigidity. The density of the unit moiety a is preferably not less than 0.9070 g/cm$^3$, particularly preferably not less than 0.9086 g/cm$^3$, here again from the viewpoint of hardness, heat resistance, and rigidity.

On the other hand, preferably 5 to 40% by weight, particularly preferably 15 to 38% by weight, of the propylene-ethylene block copolymer is accounted for by the unit moiety b from the viewpoint of impact strength, and the ethylene content is preferably 20 to 80% by weight, particularly preferably 25 to 60% by weight, from the viewpoint of impact strength.

The content of the unit moiety b is determined by immersing 2 g of a sample in 300 g of boiling xylene for 20 min to dissolve the sample, cooling the solution to room temperature, collecting the precipitated solid phase through a glass filter, drying the collected solid phase, and back-calculating the content of the unit moiety b from the weight of the solid phase.

The ethylene content may be measured by infrared spectrophotometry or the like.

The melt flow rate (MFR) of the whole crystalline propylene polymer is preferably 3 to 300 g/10 min, particularly preferably 15 to 100 g/10 min, as measured according to the procedure set forth in JIS K 7210 (230° C., 2.16 kg).

The crystalline propylene polymer as the component (A) may be produced by slurry polymerization, gas phase polymerization, or bulk polymerization in the presence of a catalyst of high stereoregularity. The polymerization may be carried out batch-wise or continuously.

When the production of the propylene-ethylene block copolymer among the crystalline propylene polymers is contemplated, a propylene-ethylene block copolymer prepared by first forming the crystalline polypropylene moiety (unit moiety a) by homopolymerization of propylene and then forming the propylene-ethylene random copolymer moiety (unit moiety b) by random copolymerization of propylene with ethylene is preferred from the viewpoint of quality of the block copolymer.

Specifically, this propylene-ethylene block copolymer may be produced by homopolymerizing propylene in the presence of a catalyst, prepared by combining an organoaluminum compound component with a solid component prepared by bringing titanium tetrachloride, an organic acid halide and an organosilicon compound into contact with magnesium chloride, and then random-copolymerizing propylene with ethylene.

MFR of the crystalline propylene polymer may either be regulated during the polymerization, or by using a peroxide after the polymerization.

Peroxides usable herein include, for example, peroxides, such as methyl isobutyl ketone peroxide, dialkyl peroxides, such as 1,3-bis(t-butyl peroxide-isopropyl)benzene, and, in addition, hydroperoxides, percarbonates, and peroxyesters.

(ii) Ethylene-α-olefin copolymer rubber [component (B)]

The ethylene-α-olefin copolymer rubber as the component (B) has an α-olefin content of preferably 20 to 50% by weight, more preferably 20 to 45% by weight, particularly preferably 20 to 40% by weight.

Specific examples of α-olefins which may include propylene, 1-butene, 1-pentene, 4-methyl-1-pentene, 1-hexene, 1-heptene, 1-octene, 1-nonene, 1-decene, and 1-eicosene.

Among them, propylene, 1-butene, 1-pentene, 1-hexene, 1-heptene, and 1-octene are preferred with propylene, 1-butene, 1-hexene, and 1-octene being particularly preferred.

The copolymer rubber may be a terpolymer rubber of ethylene and the α-olefin with a nonconjugated diene. When the α-olefin content is too low, the intensity ratio between the two valence electron spectral peaks of the resulting composition may become so large that impact strength of the composition is poor. On the other hand, when the α-olefin content is too high, the intensity ratio between the two valence electron spectral peaks may become so small that the surface hardness of the resulting composition is undesirably low.

Further, the copolymer rubber is preferably one produced in the presence of a vanadium compound catalyst, or a metallocene catalyst as disclosed in WO-91/04257.

The α-olefin content can be measured by any conventional method, such as infrared spectrophotometry or $^{13}$C-NMR, according to the infrared spectrophotometry, the value generally becomes small as compared with $^{13}$C-NMR (about 10 to 50%) with a lowering in density.

(iii) Talc [component (C)]

Talc as the component (C) which may be optionally used in the propylene resin composition of the present invention has an average particle diameter of preferably not more than 15 μm, particularly preferably 1.5 to 10 μm.

More preferred is talc having an average aspect ratio of not less than 4 with an aspect ratio of not less than 5 being particularly preferred.

The talc may be prepared, for example, by grinding a talc ore by means of an impact grinder or a micron mill type grinder or by pulverizing a talc ore by means of a micron mill, a jet mill or the like and then classifying the particles by means of a cyclone or a micron separator to regulate the particle size.

In this case, the talc ore is preferably native to China because the metallic impurity content is low.

The talc may be one which has been surface treated with various metal salts or the like. Further, a talc which has been brought to an apparent specific volume of not more than 2.50 ml/g, that is, the so-called "compressed talc," may also be used.

The average particle diameter of the talc can be determined by using a laser beam scattering type particle size distribution meter, and an example of the measuring device usable herein is model LA-500 manufactured by Horiba, Ltd.

The diameter, length, and aspect ratio of the talc may be measured by means of a microscope or the like.

(iv) Other components (optional components [component (D)]

In the propylene resin composition according to the present invention, besides the above components (A), (B), and (C), the following optional additives or compounding components may be incorporated in such an amount as will not be significantly detrimental to the effect of the present invention, or in order to improve the properties.

Specific examples of additives or compounding components usable herein include pigments for coloration, antioxidants, antistatic agents, flame retardants, light stabilizers, various nucleating agents, such as organoaluminum.talc, lubricants, various resins other than the components (A), (B), and (C), such as polyethylene, various rubbers, such as styrene-ethylene-butylene-styrene copolymer rubber, and various fillers, such as calcium carbonate and mica.

(2) Quantitative ratio

In the propylene resin composition of the present invention, each of the optional components (B) and (C) is incorporated in an amount based on 100 parts by weight of the component (A).

(i) Component (B) : ethylene-α-olefin copolymer rubber

The amount of the ethylene-α-olefin copolymer rubber as the component (B) is preferably 1 to 60 parts by weight, more preferably 3 to 40 parts by weight-, particularly preferably 2 to 30 parts by weight, based on 100 parts by weight of the component (A).

When the amount of the component (B) incorporated is too large, the hardness, rigidity, and injection moldability are deteriorated, while when the amount is too small, the impact strength is lowered.

(ii) Component (C): talc

In the propylene resin composition of the present invention, the amount of talc as the component (C) is preferably 0.1 to 50 parts by weight, particularly preferably 0.1 to 20 parts by weight, based on 100 parts by weight of the component (A).

When the amount of the component (C) incorporated is too large, the impact resistance and injection moldability of the resulting composition and, in addition, the appearance of the molded product are deteriorated. Further, in this case, the density is increased undesirably for practical use.

[II] Production of propylene resin composition (1) Kneading and granulation

When the propylene resin composition of the present invention comprises the above component (A) alone, it is prepared by the above polymerization method. On the other hand, when the propylene resin composition of the present invention comprises the component (A) and the component (B) and/or the component (C), it may be prepared by mixing these components in the above quantitative ratio and then kneading and granulating the mixture using a conventional kneading machine, such as a single screw extruder, a twin-screw extruder, a Banbury mixer, a roll mixer, a Brabender Plastograph, or a kneader, at 170 to 280° C.

The kneading/granulation is usually carried out successfully by using a twin-screw extruder. In the kneading/granulation, the mixture of the components (A) and (B) and, if necessary, component (C) may be simultaneously kneaded with one another. Alternatively, in order to improve the properties of the product, the kneading may be conducted in a stepwise manner. Thus, a part or the whole of the component (A) is first kneaded with a part or the whole of the component (C), and the remainder of the total components are then added to further conduct kneading, followed by granulation.

(2) Molding of propylene resin composition

The propylene resin composition thus prepared may be molded by injection molding (including gas injection molding) or injection compression molding (press injection) into various molded products.

[III] Properties of propylene resin composition

The propylene resin composition of the present invention, wherein intensity ratio between the two valence electron spectra, that is, the ratio of the valence electron spectral peak intensity at a bond energy of 16.5 eV to the valence electron spectral peak intensity at a bond energy of 13.5 eV, I 16.5/I 13.5, as measured by electron spectroscopy for chemical analysis (ESCA) is regulated in the range of 1.6 to 2.0, preferably 1.8 to 2.0, particularly preferably 1.9 to 2.0, thereby to regulate the amount of the rubber component exposed on the surface of the composition to a suitable level, can have such properties that the Izod impact strength (23° C., notched) is not less than 5 kJ/m$^2$, preferably not less than 10 kJ/m$^2$, more preferably not less than 13 kJ/m$^2$, particularly preferably not less than 20 kJ/m$^2$, the flexural modulus is not less than 500 MPa, preferably not less than 800 MPa, particularly preferably not less than 900 MPa, and the Rockwell hardness is preferably not less than 60, more preferably not less than 65, particularly preferably not less than 70.

The propylene resin composition of the present invention has a density of preferably not more than 1.10 g/cm$^3$, particularly preferably not more than 0.95 g/cm$^3$, and a melt flow rate (MFR: 230° C., 2.16 kg) of preferably not less than 10 g/10 min, particularly preferably not less than 25 g/10 min.

[IV] Evaluation of propylene resin composition (a) Electron spectroscopy for chemical analysis Electron spectroscopy for chemical analysis (ESCA) can quantitatively ascertain the state of bonding of elements and atoms in a very shallow surface of generally not more than 100 Å. In particular, an ESCA spectrum at a bond energy of not more than about 40 eV, that is, the so-called "valence electron spectrum" is sensitive to the molecular structure, and polypropylene and an ethylene-α-olefin copolymer rubber give different valence electron spectra.

Specifically, the spectral peak intensity at a bond energy of 13.5 eV of an ethylene-α-olefin copolymer rubber is large, while the spectral peak intensity at that bond energy of polypropylene is small.

On the other hand, the spectral peak intensity at a bond energy of 16.5 eV of polypropylene is large, while the spectral peak intensity at that bond energy of the ethylene-α-olefin copolymer rubber is small.

Therefore, with respect to a polypropylene/ethylene-α-olefin copolymer rubber composite material, a high intensity ratio between the two valence electron spectral peaks, I 16.5/I 13.5 (hereinafter often referred to simply as "spectral intensity ratio"), indicates that the amount of the ethylene-α-olefin copolymer rubber component present on the surface of the material is small.

(b) Evaluation

According to the evaluation method of the present invention, a propylene resin composition is subjected to the electron spectroscopy for chemical analysis to measure the spectral intensity ratio I 16.5/I 13.5, and the balance of properties of the composition, that is, the balance between impact strength, and rigidity and surface hardness, is evaluated based on whether or not the spectral intensity ratio is in the range of 1.6 to 2.0, preferably 1.8 to 2.0, particularly preferably 1.9 to 2.0.

When the spectral intensity ratio is less than 1.6, the amount of the rubber component present on the surface of the composition is too large, thus indicating poor rigidity and surface hardness. On the other hand, when the spectral intensity ratio exceeds 2.0, the amount of the rubber component present on the surface of the composition is too small, indicating poor impact strength. Thus, in both of the above cases, the propylene resin compositions do not have a good balance of the properties.

The following examples further illustrate the present invention but are not intended to limit it.

[I] Materials

The following materials were used.

(1) Component (A): Pellet with antioxidant incorporated therein

A-1: propylene-ethylene block copolymer, produced by slurry polymerization, comprising 84% by weight of a unit moiety a and 16% by weight of a unit moiety b having an ethylene content of 40% by weight, the MFR of the copolymer being 30 g/10 min A-2: propylene-ethylene block copolymer, produced by gas phase polymerization, comprising 75% by weight of a unit moiety a and 25% by weight of a unit moiety b having an ethylene content of 40% by weight, the MFR of the copolymer being 32 g/10 min A-3: propylene-ethylene block copolymer, produced by gas phase polymerization, comprising 92% by weight of a unit moiety a and 8% by weight of a unit moiety b having an ethylene content of 55% by weight, the MFR of the copolymer being 30 g/10 min A-4: propylene homopolymer, produced by gas phase polymerization, having an MFR of 5 g/10 min A-5: propylene homopolymer, produced by gas phase polymerization, having an MFR of 30 g/10 min A-6: propylene-ethylene block copolymer, produced by gas phase polymerization, comprising 93% by weight of a unit moiety a having a density of 0.9092 g/cm$^3$ and 7% by weight of a unit moiety b having an ethylene content of 50% by weight, the MFR of the copolymer being 30 g/10 min A-7: propylene-ethylene block copolymer, produced by gas phase polymerization, comprising 85% by weight of a unit moiety a having a density of 0.9091 g/cm³ and 15% by weight of a unit moiety b having an ethylene content of 55% by weight, the MFR of the copolymer being 28 g/10 min A-8: propylene-ethylene block copolymer, produced by gas phase polymerization, comprising 74% by weight of a unit moiety a having a density of 0.9092 g/cm³ and 26% by weight of a unit moiety b having an ethylene content of 45% by weight, the MFR of the copolymer being 31 g/10 min A-9: propylene homopolymer, produced by gas phase polymerization, having a density of 0.9092 g/cm³ and an MFR of 16 g/10 min (2) Component (B): Pellet B-1: Ethylene-1-octene copolymer rubber, produced by solution polymerization in the presence of a metallocene catalyst, having a 1-octene content of 24.2% by weight (as measured by infrared spectroscopy), an MFR of 9.3 g/10 min, and a density of 0.872 g/cm³

B-2: Ethylene-propylene copolymer rubber, produced by solution polymerization in the presence of a vanadium compound catalyst, having a propylene content of 25.5% by weight (as measured by infrared spectroscopy), an MFR of 1.2 g/10 min, and a density of 0.861 g/cm³

B-3: Ethylene-propylene-ethylidene norbornene copolymer rubber, produced by solution polymerization in the presence of a vanadium compound catalyst, having a propylene content of 28.1% by weight (as measured by infrared spectroscopy), an MFR of 0.2 g/10 min, an iodine value of 15, and a density of 0.862 g/cm³

B-4: Ethylene-propylene copolymer rubber, produced by solution polymerization in the presence of a vanadium compound catalyst, having a propylene content of 27.8% by weight (as measured by infrared spectroscopy), an MFR of 0.3 g/10 min, and a density of 0.862 g/cm³

B-5: Ethylene-1-butene copolymer rubber, produced by solution polymerization in the presence of a vanadium compound catalyst, having a 1-butene content of 20.4% by weight (as measured by infrared spectroscopy), an MFR of 1.0 g/10 min, and a density of 0.885 g/cm³

B-6: Ethylene-1-octene copolymer rubber, produced by solution polymerization in the presence of a metallocene catalyst, having a 1-octene content of 25.5% by weight (as measured by infrared spectroscopy), an MFR of 0.9 g/10 min, and a density of 0.871 g/cm³

B-7: Ethylene-propylene copolymer rubber, produced by solution polymerization in the presence of a vanadium compound catalyst, having a propylene content of 24.6% by weight (as measured by infrared spectroscopy), an MFR of 46.7 g/10 min, and a density of 0.873 g/cm³

B-8: Ethylene-1-octene copolymer rubber, produced by solution polymerization in the presence of a metallocene catalyst, having a 1-octene content of 24.7% by weight (as measured by infrared spectroscopy), an MFR of 58.6 g/10 min, and a density of 0.872 g/cm³

B-9: Ethylene-1-octene copolymer rubber, produced by solution polymerization in the presence of a metallocene catalyst, having a 1-octene content of 23.9% by weight (as measured by infrared spectroscopy), an MFR of 11.7 g/10 min, and a density of 0.872 g/cm³

MFR referred to herein is a value measured under conditions of 230° C. and 2.16 kg.

(3) Component (C)

C-1: talc having an average particle diameter of 5.5 μm and an average aspect ratio of 6

C-2: talc having an average particle diameter of 6.1 μm and an average aspect ratio of 6

[II] Measurement

The following measurements were carried out:

(1) Spectral intensity ratio

Measured by electron spectroscopy for chemical analysis (ESCA).

Measuring device: "ESCA 1000," manufactured by Shimadzu Seisakusho Ltd.

Specimen: Injection molded sheet (100×120×2 mmt)

Measuring conditions:

Exciting X-ray=MgKα line (1253.6 eV)

Output of X-ray 8 kV, 30 mA

Pass energy=31.5 eV

Chemical shift correction=The binding energy of $C_{1S}$ peak of neutral carbon (—$CH_2$—) was adjusted to 285.0 eV The minimum point at and around a bond energy of 27 eV in the ESCA spectrum was connected to the minimum point at and around a bond energy of 11 eV by a straight line to make a background, and the heights of two peaks were measured to determine the intensity of the peak at a bond energy of 16.5 eV, I 16.5, and the intensity of the peak at a bond energy of 13.5 eV, I 13.5.

(2) Impact strength: Izod impact strength (notched)

Measured at 23° C. according to JIS K 7110.

(3) Rigidity: flexural modulus

Measured according to JIS K 7203. The found value also serves as a measure of heat resistance.

(4) Density

Measured according to JIS K 7112.

(5) Hardness: Rockwell hardness

Measured at 23° C. on R scale according to JIS K 7202.

(6) MFR

Measured at 230° C. under a load of 2.16 kg according to JIS K 7210.

[III] Experiment

EXAMPLES 1 TO 17 AND COMPARATIVE EXAMPLES 1 TO 5

The components (A) to (C) were thoroughly mixed in the ratios indicated in Table 1 and 2 in a tumbling mixer at 25 rpm for 10 min.

Thereafter, the mixtures were kneaded and granulated by means of a high-speed, twin-screw extruder (KCM) manufactured by Kobe Steel, Ltd., and the resultant pellets were fed into an injection molding machine and molded into sheet specimens which were then evaluated as described above.

The results are shown in Tables 1 and 2.

TABLE 1

| | Propylene resin composition | | | | | | Evaluation | | | |
|---|---|---|---|---|---|---|---|---|---|---|
| Ex. No. | Component (A): crystalline propylene polymer | | Component (B): ethylene-α-olefin copolymer rubber | | Component (C): talc | | Spectral intensity ratio (—) | Izod impact strength (23° C., notched) kJ/m$^2$ | Flexural modulus MPa | Density g/cm$^3$ |
| Ex. 1 | A-1 | 100 | — | — | — | — | 1.95 | 7.0 | 1,100 | 0.90 |
| Ex. 2 | A-2 | 100 | B-1 | 8 | — | — | 1.90 | 60.2 | 970 | 0.90 |
| Ex. 3 | A-1 | 100 | B-2 | 26 | C-1 | 5 | 1.92 | 49.6 | 1,110 | 0.92 |
| Ex. 4 | A-3 | 100 | B-3 | 45 | C-1 | 36 | 1.93 | 21.5 | 1,910 | 1.04 |
| Ex. 5 | A-1 | 100 | B-2 | 15 | — | — | 1.82 | 54.6 | 970 | 0.90 |
| Ex. 6 | A-3 | 100 | B-2 | 45 | C-1 | 36 | 1.81 | 24.1 | 1,940 | 1.04 |
| Ex. 7 | A-3 | 100 | B-2 | 136 | C-1 | 36 | 1.71 | ≧90.0 | 590 | 0.97 |
| Comp. Ex. 1 | A-4 | 100 | — | — | — | — | 2.10 | 2.5 | 1,300 | 0.90 |
| Comp. Ex. 2 | A-5 | 100 | B-3 | 8 | — | — | 2.02 | 4.1 | 970 | 0.90 |
| Comp. Ex. 3 | A-3 | 100 | — | — | C-1 | 36 | 2.12 | 2.0 | 3,290 | 119 |
| Comp. Ex. 4 | A-3 | 100 | B-2 | 182 | C-1 | 36 | 1.54 | ≧90.0 | 340 | 0.96 |

TABLE 2

| | Propylene resin composition | | | | | | Evaluation | | | | | |
|---|---|---|---|---|---|---|---|---|---|---|---|---|
| | Component (A): Crystalline propylene polymer | | Component (B): Ethylene-α-olefin copolymer rubber | | Component (C): Talc | | Spectral intensity ratio | Rockwell hardness | Izod impact strength (23° C., notched) | Density | MFR | Flexural modulus |
| Ex. No. | Type | Pts. wt. | Type | Pts. wt. | Type | Pts. wt. | (—) | (—) | kJ/m$^2$ | g/cm$^3$ | g/10 min | MPa |
| Ex. 8 | A-6 | 100 | B-4 | 45.5 | C-2 | 36.4 | 1.92 | 63.9 | 23.3 | 1.03 | 8.1 | 1,870 |
| Ex. 9 | A-7 | 100 | B-5 | 26.3 | C-2 | 5.3 | 1.92 | 62.4 | 42.7 | 0.92 | 19.0 | 1,130 |
| Ex. 10 | A-8 | 100 | B-6 | 3.2 | C-2 | 3.2 | 1.95 | 75.3 | 20.5 | 0.91 | 25.0 | 1,300 |
| Ex. 11 | A-8 | 100 | B-6 | 7.5 | — | — | 1.92 | 62.2 | 61.7 | 0.89 | 25.7 | 1,020 |
| Ex. 12 | A-8 | 100 | B-6 | 3.1 | — | — | 1.96 | 76.0 | 31.2 | 0.90 | 26.6 | 1,210 |
| Ex. 13 | A-8 | 100 | — | — | — | — | 1.98 | 77.5 | 13.2 | 0.90 | 30.2 | 1,250 |
| Ex. 14 | A-6 | 100 | B-7 | 45.5 | C-2 | 36.4 | 1.74 | 51.6 | 9.5 | 1.03 | 33.8 | 1,800 |
| Ex. 15 | A-7 | 100 | B-8 | 26.3 | C-2 | 5.3 | 1.70 | 46.3 | 65.8 | 0.92 | 27.7 | 1,070 |
| Ex. 16 | A-7 | 100 | B-9 | 14.9 | — | — | 1.84 | 43.8 | 58.6 | 0.89 | 23.4 | 970 |
| Ex. 17 | A-8 | 100 | B-8 | 7.5 | — | — | 1.87 | 45.1 | 60.1 | 0.89 | 32.2 | 1,040 |
| Comp. Ex. 5 | A-9 | 100 | — | — | — | — | 2.11 | 100.0 | 2.1 | 0.90 | 16.3 | 1,400 |

What is claimed is:

1. A method for evaluating a propylene resin composition, which comprises subjecting a propylene resin composition to electron spectroscopy for chemical analysis to measure the ratio of the valence electron spectral intensity at a bond energy of 16.5 eV to the valence electron spectral intensity at a bond energy of 13.5 eV, I 16.5/I 13.5; and evaluating, based on the ratio, the amount of a rubber component present on the surface of the composition.

2. The method according to claim 1, wherein the propylene resin composition comprises a propylene-ethylene block copolymer and an ethylene-α-olefin copolymer rubber.

3. The method according to claim 2, wherein the propylene resin composition further comprises talc.

4. A method for improving mechanical properties of a propylene resin composition, comprising controlling the ratio of the valence electron spectral intensity at a bond energy of 16.5 eV to the valence electron spectral intensity at a bond energy of 13.5 eV, I 16.6/I 13.5, in the range of 1.6 to 2.0 as measured by electron spectroscopy for chemical analysis, wherein said propylene resin composition has a notched Izod impact strength at 23 ° C. of not less than 5 kJ/m$^2$ and a flexural modulus of not less than 500 MPa.

5. The method according to claim 4, which comprises controlling the ratio I 16.6/I 13.5 in the range of 1.8 to 2.0 and a Rockwell hardness to not less than 60.

6. The method according to claim 4, wherein the propylene resin composition comprises a propylene-ethylene block copolymer and an ethylene-α-olefin copolymer rubber.

7. The method according to claim 6, wherein the propylene resin composition further comprises talc.

* * * * *